US007610228B2

(12) United States Patent
Hellerstein et al.

(10) Patent No.: US 7,610,228 B2
(45) Date of Patent: Oct. 27, 2009

(54) AUTOMATED SERVICE LEVEL MANAGEMENT IN FINANCIAL TERMS

(75) Inventors: Joseph L. Hellerstein, Ossining, NY (US); Gautam Kar, Yorktown Heights, NY (US); Alexander Keller, Mamaroneck, NY (US); W. Nathaniel Mills, III, Coventry, CT (US); John F. Morar, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 1489 days.

(21) Appl. No.: 09/896,254

(22) Filed: Jun. 29, 2001

(65) Prior Publication Data
US 2003/0004848 A1 Jan. 2, 2003

(51) Int. Cl.
*G06Q 30/00* (2006.01)
(52) U.S. Cl. .............................. 705/36; 705/26; 705/27; 705/28; 705/37; 709/223; 709/224; 709/225; 709/226
(58) Field of Classification Search .................. 705/28, 705/26, 27, 35, 36, 37; 709/223, 224, 225, 709/226
See application file for complete search history.

(56) References Cited

U.S. PATENT DOCUMENTS

| | | | |
|---|---|---|---|
| 5,473,773 | A | 12/1995 | Aman et al. |
| 5,608,621 | A | 3/1997 | Caveney et al. |
| 5,615,109 | A | 3/1997 | Eder |
| 5,946,662 | A | 8/1999 | Ettl et al. |
| 6,073,175 | A | 6/2000 | Tavs et al. |
| 6,857,020 | B1 * | 2/2005 | Chaar et al. .................. 709/226 |
| 6,901,442 | B1 * | 5/2005 | Schwaller et al. ........... 709/224 |
| 7,062,455 | B1 * | 6/2006 | Tobey .......................... 705/28 |

OTHER PUBLICATIONS

U.S. Appl. No. 09/716,862, filed Nov. 20, 2000, R.N. Chang et al. and entitled, "Apparatus, System, and Method for Managing Quality-of-Service-Assured E-Business Service Systems."

U.S. Appl. No. 09/642,526, filed Aug. 18, 2000, J.L. Hellerstein et al. and entitled, "Electronic Service Level Agreement for Web Site and Computer Services Hosting."

(Continued)

*Primary Examiner*—Nga B. Nguyen
(74) *Attorney, Agent, or Firm*—Kenneth R. Corsello; Ryan, Mason & Lewis, LLP

(57) ABSTRACT

Electronic contracts or "eContracts" for representing service level agreements are provided. In one illustrative embodiment, the eContract may comprise information pertaining to: (a) descriptions of business transactions in IT terms; (b) financial implications of business transaction service levels; and (c) reporting to be done in business terms. Of course, the eContract may comprise other terms and conditions. In an illustrative aspect of the invention, a system for managing IT resources in terms of business financials comprises an electronic contract authoring system or "ecAuthoring system," an electronic contract manager module or "ecManager," and one or more electronic contract agent modules or "ecAgents" that may run on IT elements (e.g., components of the network) that are being managed. Analysts interact with the ecAuthoring system to construct eContracts. An eContract is input to an ecManager that interprets the contract to report on and optimize IT resources based on business financials. The ecManager collaborates with ecAgents to monitor, report, and enforce contracts expressed in such business terms.

36 Claims, 6 Drawing Sheets

OTHER PUBLICATIONS

Tomoo Fujita, "Web Computing Operation Manager for Integrated Network and System Management," NEC Research and Development, vol. 41, No. 4, pp. 318-321, Oct. 2000.

Amitava Dutta-Roy, "The Cost of Quality in Internet-Style Networks," IEEE Spectrum, 9 pages, Sep. 2000.

D.A. Menascé et al., "Resource Management Policies for E-commerce Servers," Performance Evaluation Review, vol. 27, No. 4, 9 pages, Mar. 2000.

Gregory A. Kruger, "The Supply Chain Approach to Planning and Procurement Management," Hewlett-Packard Journal, pp. 28-38, Feb. 1997.

* cited by examiner

FIG. 7

TRANSACTION DEFINITIONS 700

| Tx ID (732) | TYPE (734) | LOCATION (736) | PARAMETERS (738) |
|---|---|---|---|
| 1 | URL | http://mycompany.com/BillMeNow.html | account=xyz |
| 2 | PING | 128.13.23.33 | |

FINANCIAL METRICS 710

| UNIT (740) | UnitRef (742) | ITMetric (744) | ITValue (746) | ITSource (748) | FIMetric (750) | FIValue (752) |
|---|---|---|---|---|---|---|
| Tx | 1 | RESPONSE | <2 SECONDS | PROBE 13 | COST | $0.10 |
| MONTH | | | | | REVENUE | $400.00 |

FINANCIAL REPORTING AND OPTIMIZATION 720

| TYPE (754) | INTERVAL (756) | AGGREGATION (758) | FIMETRIC (760) |
|---|---|---|---|
| REPORT | 5 MINUTES | AVERAGE | REVENUE |
| OPTIMIZE | 1 QUARTER | SUM | PROFIT |

AUTOMATED SERVICE LEVEL MANAGEMENT IN FINANCIAL TERMS

FIELD OF THE INVENTION

The present invention relates generally to network and system management techniques and, more particularly, to management of service level agreements in accordance with such networks and systems.

BACKGROUND OF THE INVENTION

The advent of Internet-based electronic commerce (eCommerce) has resulted in increased attention to the relationship between information technology (IT) and business financials. While such considerations have often been made in the past, the focus has been cost reduction. That is, in essence, the IT purchasing organization sought to minimize expenses for IT equipment and operations subject to constraints on what was needed for the business. The prevalence of eCommerce has shifted the focus to revenues. As has become evident, IT is essential for business activities such as advertising, suggesting customer purchases, product comparisons, and customer payment.

That IT is increasingly central to revenue generation will ultimately lead to a fundamentally different relationship between business functions and information technology. In particular, we expect customers to seek capabilities that provide means to manage their IT in terms of business financials. However, prior to the present invention, these capabilities have not been available.

As is known, businesses run their applications using an IT infrastructure (e.g., server, software, network connectivity) typically provided by a third party, referred to as the "service provider." A service level agreement or SLA provides means by which the expectations of the service provider and the customer can be negotiated with respect to the customer's applications that are hosted by the infrastructure of the service provider. An SLA between an application owner and the service provider defines terms and conditions for this hosting service. The SLA may include expected bandwidth throughput at the network and/or servers, disk space utilization, availability, i.e., up-time of network and server resources, as well recovery time upon failure, and pricing for various levels of service. An SLA may also be between a service provider and a consumer of these services.

Today, information technology is managed in terms of these SLAs which focus on IT considerations, especially availability and response time requirements. Included in this scope are U.S. Pat. No. 5,473,773 issued to Aman et al. which describes an apparatus and method for managing data processing workloads with two or more processing goals (or service level objectives); T. Fujita, "Web Computing Operation Manager for Integrated Network and System Management," NEC Research and Development vol. 41, no. 4, pp. 318-321, October 2000, which describes business level requirements for service level agreements; A. Dutta-Roy, "The Cost of Quality in Internet-style Networks," IEEE Spectrum, September 2000, which addresses the implications of service level quality in the Internet and mechanisms for achieving quality objectives; and U.S. Pat. No. 6,073,175 issued to Tavs et al. which describes methods for obtaining different service level information from web page content; the disclosures of which are incorporated by reference herein. While these efforts advance the art in terms of traditional IT management, they do not provide an automated way to relate IT level information (e.g., response times, throughputs) to business financials (e.g., costs, revenues). Rather, such relationships are done separately by analysts or by ad hoc programs.

There is another area that broadly relates to IT management, i.e., computer-based automation of supply chain management. That is, computing capacity can be viewed as a kind of material whose inventory levels must be managed. For example, G. A. Kruger, "Supply Chain Approach to Planning and Procurement Management," Hewlett Packard Journal, vol. 48, no. 1, pp. 28-38, February 1997, the disclosure of which is incorporated by reference herein, describes the requirements for capacity planning and procurement for supply chain management. Also, U.S. Pat. No. 5,615,109 issued to Eder et al., the disclosure of which is incorporated by reference herein, describes methods for generating feasible, profit maximizing requisition sets. Further, U.S. Pat. No. 5,608,621 issued to Cavency et al., the disclosure of which is incorporated by reference herein, describes how to control the number of units of parts in an inventory. Still further, U.S. Pat. No. 5,946,662 issued to Ettl et al., the disclosure of which is incorporated by reference herein, describes how to optimize inventory levels in complex supply chain networks. Yet, none of these efforts address a central issue: how should the IT layer relate to the business layer. Without this mapping, it is unclear how to apply the art of supply chain management.

Recently, D. A. Menasce et al., "Resource Management Policies for eCommerce Servers," Performance Evaluation Review, vol. 27, no. 4, pp. 27-35, March 2000, the disclosure of which is incorporated by reference herein, describes a method for relating web response times into discouraged customer requests that can be used for reporting and control of IT resources. The Menasce et al. approach relies on a customer behavior model graph to describe potential customer actions. Also, they do not relate management in business terms to SLAs. Instead, their measure of business impact is shopping-based revenue. This is too limiting in that many customer-provider relationships may exist. For example, Internet Service Providers (ISPs) typically charge residential customers a fixed amount for a connection, depending on the connection bandwidth. However, availability problems will reduce the monthly charge by the amount of downtime incurred.

Further, the U.S. patent application identified as Ser. No. 09/642,526, filed Aug. 18, 2000 and entitled "Electronic Service Level Agreement for Web Site and Computer Services Hosting," the disclosure of which is incorporated by reference herein, discloses computer-based methods and systems for building, provisioning and executing one or more electronic service level agreements (eSLAs) for Web and other computer hosting services, which specify and enforce service contracts for Web and other computer hosting services. Further, the U.S. patent application discloses a process whereby an eSLA can be used for negotiation, service level monitoring, and enforcement. However, the eSLA system does not disclose automated techniques for managing IT resources in terms of business financials.

Still further, the U.S. patent application identified as Ser. No. 09/716,862, filed Nov. 20, 2000 and entitled "Apparatus, System, and Method for Managing Quality-of-Service-Assured E-Business Service Systems," the disclosure of which is incorporated by reference herein, discloses e-business service level agreement management techniques for managing quality of service (QoS) assured e-business service systems. Again, however, the e-business SLA techniques do not include automated techniques for managing IT resources in terms of business financials.

To summarize, while IT service level agreements are in wide spread use, no system or automated method connects IT service levels with business financials. As a result, considerable human expertise is needed to report IT service levels in business terms and to optimize IT resource allocations to meet financial objectives.

SUMMARY OF THE INVENTION

The present invention provides automated techniques for managing IT resources in terms of business financials. By way of example only, IT resources may comprise such metrics as response times and throughputs associated with the components (e.g., servers, software) and interconnectivity (e.g., links) of the distributed computing network that is being managed. Further, by way of example only, business financials may comprise metrics such as costs and revenues associated with operating the components and interconnectivity of the distributed computing network. It is to be appreciated that the invention is not intended to be limited to any particular IT metric or any particular business or financial metric.

The present invention employs an electronic contract or "eContract" for representing a service level agreement. In one illustrative embodiment, the eContract may comprise information pertaining to: (a) descriptions of business transactions in IT terms; (b) financial implications of business transaction service levels; and (c) reporting to be done in business terms. Of course, the eContract may comprise other terms and conditions.

In an illustrative aspect of the invention, a system for managing IT resources in terms of business financials comprises an electronic contract authoring system or "ecAuthoring system," an electronic contract manager module or "ecManager," and one or more electronic contract agent modules or "ecAgents" that may run on IT elements (e.g., components of the network) that are being managed. Analysts interact with the ecAuthoring system to construct eContracts. An eContract is input to an ecManager that interprets the contract to report on and optimize IT resources based on business financials. The ecManager collaborates with ecAgents to monitor, report, and enforce contracts expressed in such business terms.

In another illustrative aspect of the invention, a computer-based methodology provides techniques for reporting on IT service levels in business terms. This method may comprise steps for: (a) identifying business transactions; (b) computing transaction service levels; (c) computing financial metrics based on service levels; and (d) reporting the results.

In yet another illustrative aspect of the invention, a computer-based methodology provides techniques for taking actions to achieve objectives specified in an eContract. This method may comprise steps for: (a) identifying business transactions; (b) forecasting transactions over an enactment interval; (c) predicting performance and determining optimizations based on financial criteria; and (d) initiating actions.

In a further aspect of the invention, techniques for use in managing a service level associated with resources in an IT system based on financial terms are provided. The techniques may comprises: (i) maintaining an electronic contract that contains information pertaining to descriptions of one or more business transactions in IT terms, financial implications of one or more business transaction service levels, and reporting to be performed in one or more financial terms; and (ii) measuring the operation of the IT system in terms of one or more business metrics based on the electronic contract.

The measuring operation may comprise monitoring one or more IT parameters and evaluating results in terms of the one or more business metrics. The evaluating operation may be performed in real time or at a subsequent time. Further, the measuring operation may comprise accumulating a historical collection of IT data and evaluating results in terms of the one or more business metrics. Still further, the measuring operation may comprise collecting measurement data from one or more sources, combining the collected measurement data, and interpreting the collected measurement data in terms of the one or more business metrics. The measurement operation may comprise monitoring hardware characteristics of the IT system such as temperature and power consumption. The measurement operation may also comprise monitoring software characteristics of the IT system such as bandwidth usage, availability, response time, and latency. It is to be understood that the IT system comprises a collection of hardware and software intended to store or deliver data in a digital form.

The one or more business metrics may comprise a measurement that directly measures the performance of a business. The measurement may comprise operational cost, customer satisfaction, and relative industry performance. The one or more business metrics may be converted to one or more financial equivalents. The one or more financial equivalents may comprise a cost of each lost connection, a cost per second of down time, and a relationship between revenue and network latency. Results of the one or more business metrics are used to set IT parameters. Further, the one or more business metrics may be reported to one or more parties. The one or more business metrics may also be aggregated so as to obscure details reported to a third party. The one or more business metrics may be inferred from the electronic contract.

It is to be appreciated that reporting may be performed in financial terms based on the electronic contract, while enactment (initiating actions) is performed based on financial optimizations using the electronic contract.

The benefits accruing from the present invention are considerable. For example, through the systems and methodologies described herein, businesses can manage their IT in a way that achieves financial objectives. The specifics of the transactions and the associated financials can be changed without recompiling code or changing program interfaces. This is done by externalizing key information in eContracts. In addition, businesses will be able to immediately assess the financial and monetary impact of an IT service disruption or outage, thus allowing them to prioritize repair and troubleshooting tasks. This is a significant improvement over conventional system management techniques, which only focus on the IT level.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 7 is a diagram illustrating an example of information content in an electronic contract according to an embodiment of the present invention.

DETAILED DESCRIPTION OF THE PREFERRED EMBODIMENT

The present invention will be explained below in the context of an illustrative electronic commerce environment such as an Internet (or World Wide Web) service provider environment. That is, the parties to an eContract are a service provider (e.g., a party providing services in association with one or more servers) and a consumer (e.g., a client) of these services. Also, as mentioned above, the parties may be a web application owner and a service provider (e.g., the party providing an infrastructure for hosting the web application, such as the server, software, network interconnectivity, etc.). However, it is to be understood that the present invention is not limited to such particular environments. Rather, the invention is more generally applicable to any IT environment in which it is desirable to manage IT resources in terms of business financials. As mentioned above, the present invention employs electronic contracts or eContracts for representing service level agreements. In accordance with one embodiment of the invention, an eContract comprises three main components:

(1) A description of business work units or transactions. Examples of such business work units are "browsing an online catalogue" or a "credit check." These work units are sufficiently specific so that they can be generated synthetically and/or recognized at the IT level.

(2) Financials for transactions. This section of the eContract relates transactions to financial metrics. For example, there may be $0.02 revenue provided to the service provider for each successful completion of a transaction of a specific type. Or, it may be that a fee paid to a service provider is fixed; however, if transactions exceed specified response time limits (e.g., 1 second), there is a cost incurred by the service provider.

(3) Financial reporting and optimization criteria. There are two parts to this section; one for the service provider and one for the customer, since they may well have different perspectives on the business metrics of interest and what is to be optimized (e.g., minimize cost, maximize revenue, maximize profits).

In this context, a detailed explanation of an illustrative system and methodologies for enabling the management of IT resources in terms of business financials will now be given.

Figure 1:
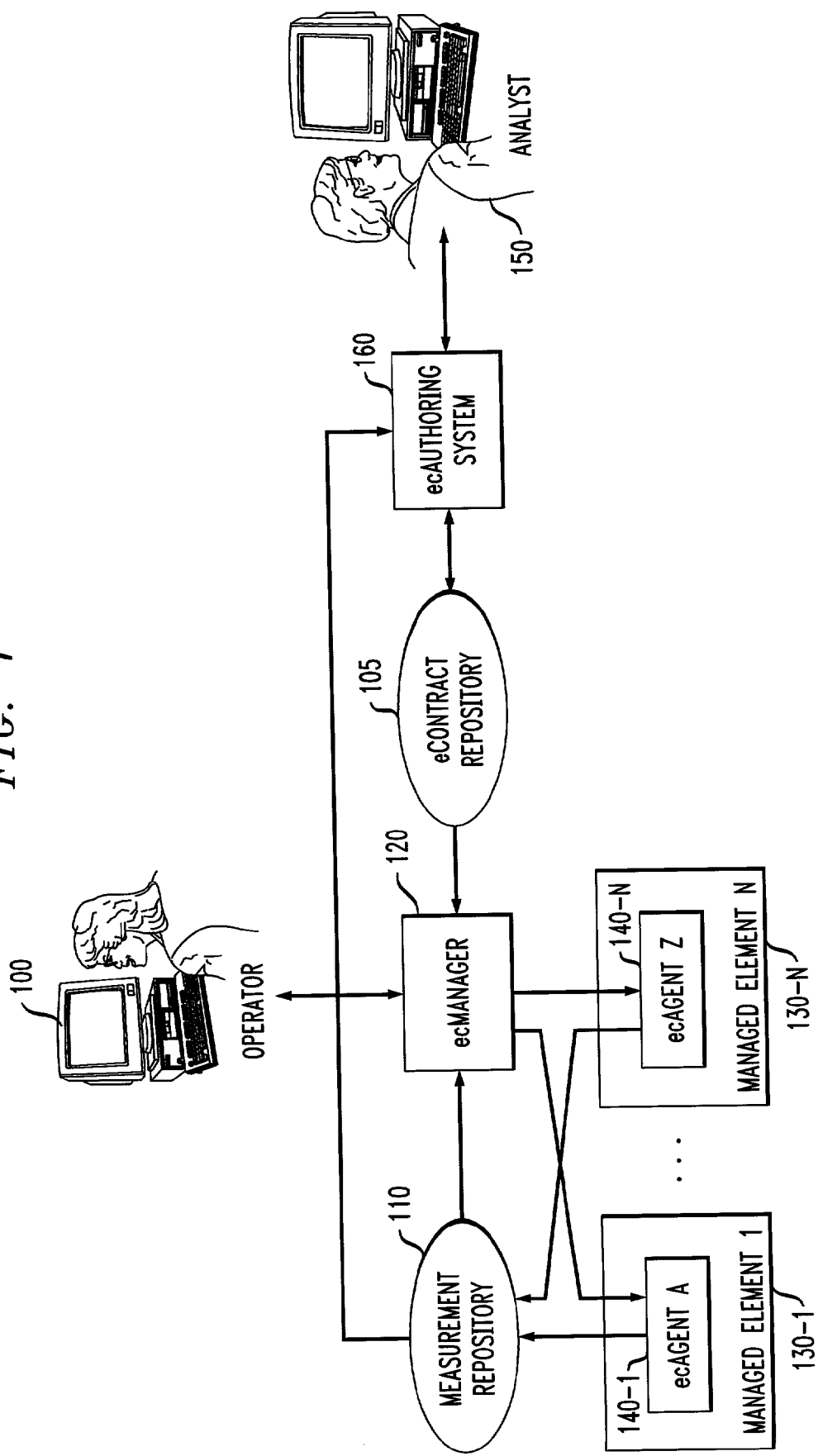
FIG. 1 is a block diagram illustrating an automated service level management system according to an embodiment of the present invention and an overall environment in which such system may operate.

Referring initially to FIG. 1, a block diagram illustrates an automated service level management system according to an embodiment of the present invention and an overall environment in which such system may operate. As shown, the system is interacted with by one or more human operators 100 and one or more human analysts 150. The operators and analysts may interface with the system via their own respective computer systems or directly via the computer system(s) that the automated service level management system of the invention is implemented on. The automated service level management system, according to this embodiment of the invention, comprises an electronic contract or eContract repository 105, a measurement repository 110, an electronic contract manager module (referred to as an ecManager) 120, a plurality of electronic contract agent modules (referred to as ecAgents) 140-1 through 140-N, and an electronic contract authoring system (referred to as an ecAuthoring system) 160. It is to be appreciated that the plurality of ecAgents are respectively located in the plurality of elements or components 140-1 through 140-N of the network being managed by the system of the invention. By way of example only, the managed elements may be servers in the distributed computing system being managed. Also, N may represent any number of ecAgents and elements that are sought to be managed by the inventive system. Further, it is to be understood that an ecAgent may be associated with more than one managed element.

In operation, the one or more analysts 150 interact with the ecAuthoring system 160 to construct eContracts which are stored in the eContracts repository 105. Once constructed, eContracts are used by the ecManager, in association with the one or more operators 100, to determine what data should be collected and hence what data collection commands to send to the plurality of ecAgents 140 residing in the plurality of managed elements 130. Once data has been collected from the ecAgents and stored in the measurement repository 110, the ecManager 120 employs the eContracts in combination with the measurement repository to determine control actions to take in order to achieve business objectives. An ecAgent accepts monitoring and control commands from the ecManager and writes monitored data into the measurement repository. Details of these operations in accordance with their respective functional components will now be explained.

Figure 2:
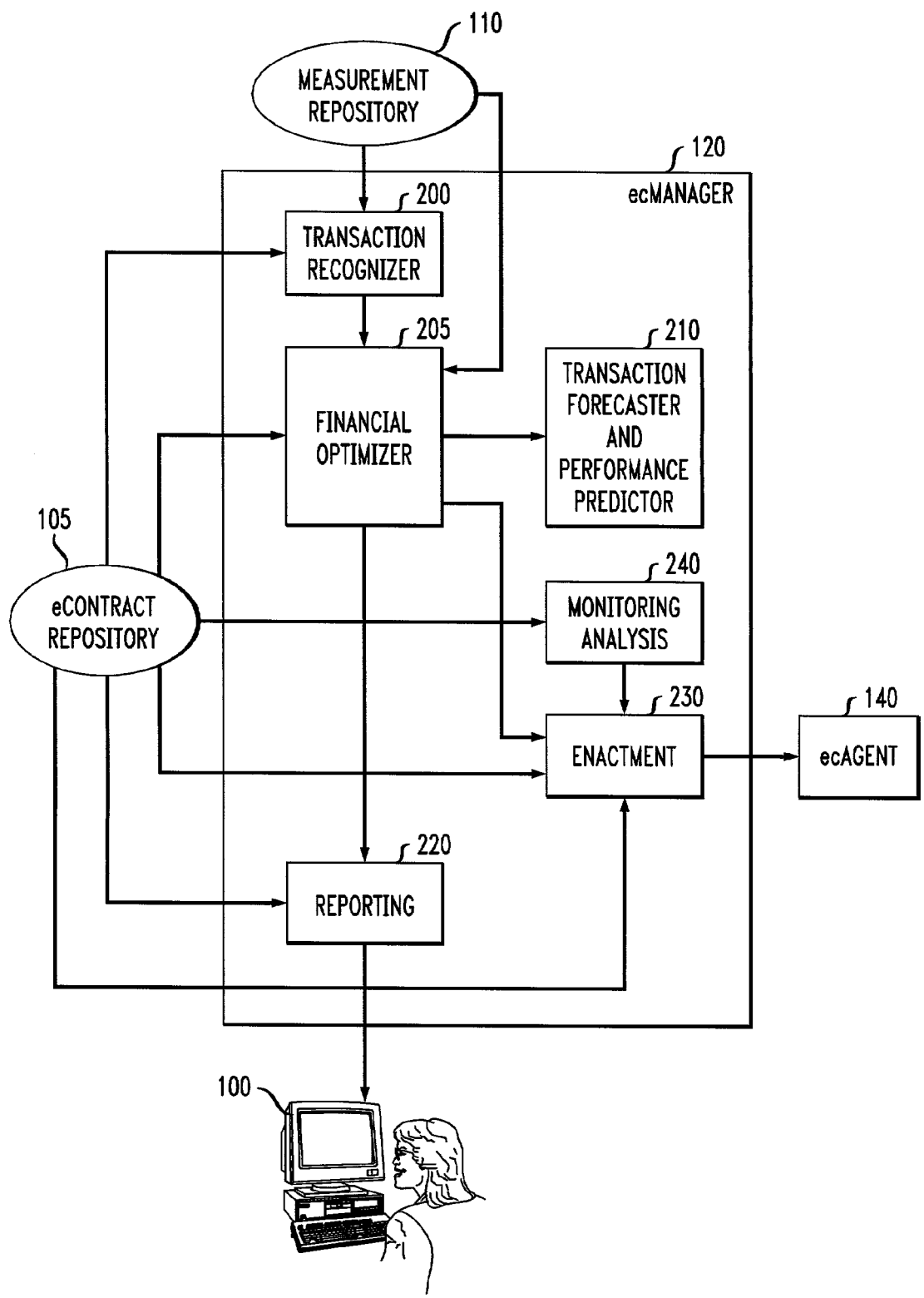
FIG. 2 is a block diagram illustrating components and interactions of an electronic contract manager module according to an embodiment of the present invention.

FIG. 2 is a block diagram illustrating components and interactions of an electronic contract manager module according to an embodiment of the present invention. Specifically, FIG. 2 shows details of the ecManager 120 according to one embodiment of the invention. As shown, the ecManager 120 comprises a transaction recognizer 200, a financial optimizer 205, a transaction forecaster and performance predictor 210, a reporting module 220, an enactment module 230, and a monitoring analysis module 240.

In operation, the transaction recognizer 200 takes as input measurement data from repository 110 (FIG. 1) and an eContract from repository 105 (FIG. 1) to determine the start and end of the business transactions. This information along with the eContract and measurement data is input to the financial optimizer 205 that determines how to achieve the business objectives expressed in the eContract. This is done in part by making use of the transaction forecaster and performance predictor 210. Output from the financial optimizer is used for reporting to the one or more operators 100 in accordance with module 220. Output from the financial optimizer is also used for enactment in accordance with module 230. The former (reporting operation) is based on the preferred metrics specified in the eContract. The latter (enactment operation) depends on relationships between the financials to optimize and the IT metrics (e.g., response times and throughputs), which is also specified in the eContract. The monitoring analysis module 240 reads information from the eContract repository to determine what data should be collected and communicates this to the enactment module. The enactment module then sends command instructions to one or more of the ecAgents 140 to collect such data from the managed elements.

Figure 3:
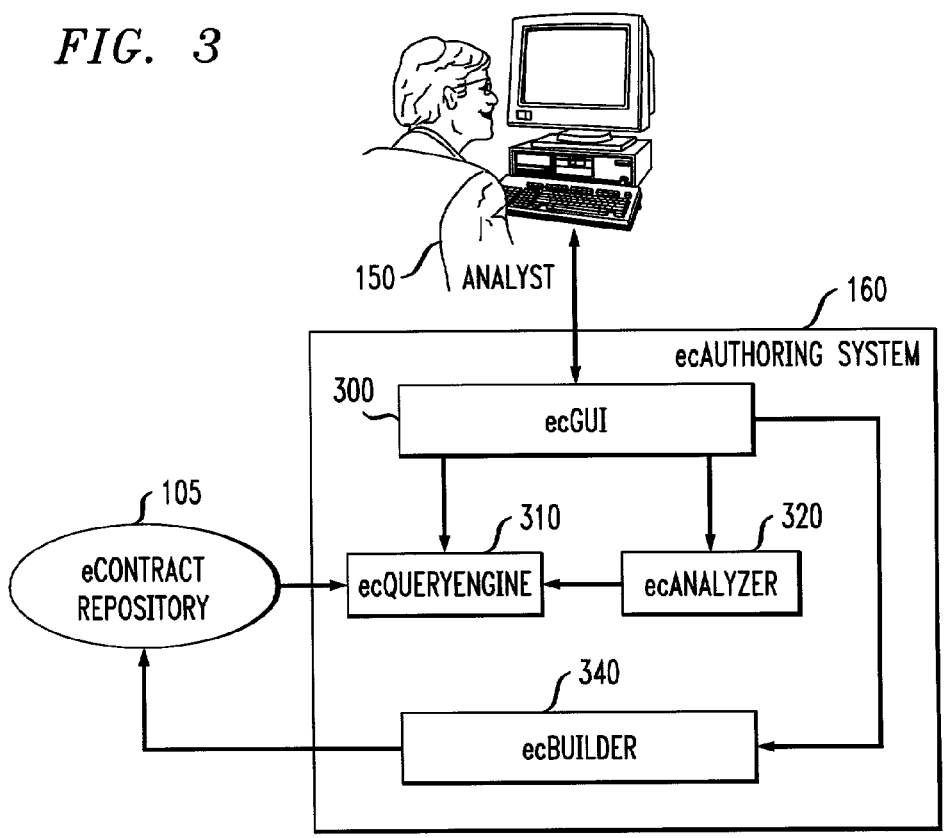
FIG. 3 is a block diagram illustrating components and interactions of an electronic contract authoring system according to an embodiment of the present invention.

FIG. 3 is a block diagram illustrating components and interactions of an electronic contract authoring system according to an embodiment of the present invention. Specifically, FIG. 3 shows details of the ecAuthoring system 160 according to one embodiment of the invention. As shown, the ecAuthoring system 160 comprises an electronic contract graphical user interface (ecGUI) 300, an electronic contract query engine (ecQuery engine) 310, an electronic contract analyzer (ecAnalyzer) 320, and an electronic contract builder (ecBuilder) 340.

In operation, the ecGUI 300 provides a mechanism for the analyst 150 to interact with the ecAuthoring system and provides overall control of the ecAuthoring system. The ecQuery engine 310 provides a mechanism to locate related contracts in the eContract repository 105, which allows the analyst to create new contracts by incrementally modifying existing contracts. The ecAnalyzer 320 checks contracts for consistency and completeness. The ecBuilder 340 constructs the contract based on the analyst-specified requirements.

Figure 4:
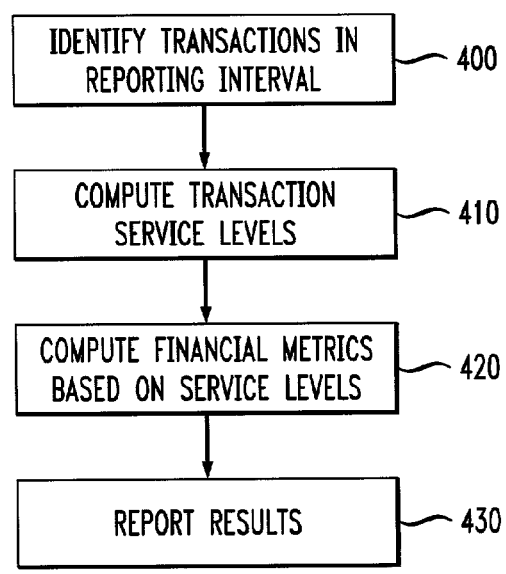
FIG. 4 is a flow diagram illustrating a methodology for reporting service levels in financial terms according to an embodiment of the present invention.

FIG. 4 is a flow diagram illustrating a methodology for reporting service levels in financial terms according to an embodiment of the present invention. In step 400, the transaction recognizer 200 of the ecManager 120 is used to identify the transactions to be reported on. In step 410, the transaction forecaster and performance predictor 210 of the ecManager is used to compute transaction service levels (e.g., response time, throughput, etc.). In step 420, the financial optimizer 205 of the ecManager is used to compute financial metrics (e.g., cost, revenues, etc.) based on the service levels. In step 430, the reporting module 220 of the ecManager generates an appropriate report.

Figure 5:
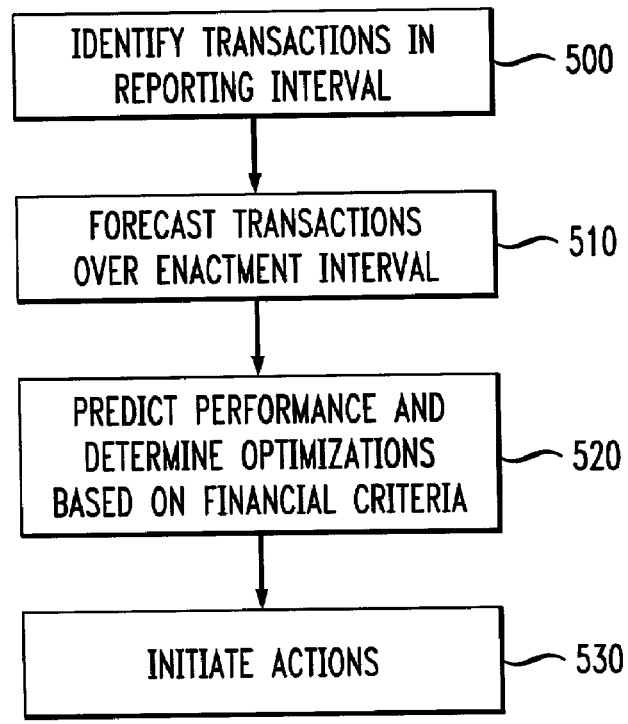
FIG. 5 is a flow diagram illustrating a methodology for initiating IT actions to achieve business level optimizations according to an embodiment of the present invention.

FIG. 5 is a flow diagram illustrating a methodology for initiating IT actions to achieve business level optimizations according to an embodiment of the present invention. That is, FIG. 5 describes how actions are taken to achieve financial goals specified in an eContract. In step 500, the transaction recognizer 200 of the ecManager 120 is used to identify the transactions to be reported on within some reporting interval. In step 510, the transaction forecaster and performance predictor 210 of the ecManager is used to forecast transaction arrivals. In step 520, the transaction forecaster and performance predictor 210 in combination with the financial optimizer 205 of the ecManager is used to predict performance and to determine IT optimizations needed to achieve the financial objectives expressed in the eContract. In step 530, the enactment module 230 of the ecManager executes appropriate actions to achieve the IT objectives.

Figure 6:
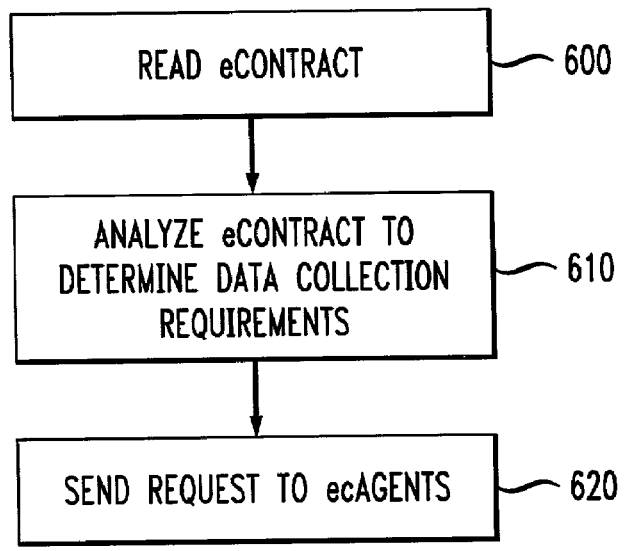
FIG. 6 is a flow diagram illustrating a methodology for determining data collection requirements to be carried out by electronic contract agent modules according to an embodiment of the present invention.

FIG. 6 is a flow diagram illustrating a methodology for determining data collection requirements to be carried out by electronic contract agent modules according to an embodiment of the present invention. That is, FIG. 6 describes how it is determined what data should be collected by ecAgents. In step 600, the monitoring analyzer 240 of the ecManager reads the eContract. In step 610, this same component determines what IT metrics should be collected. In step 620, the enactment module 230 of the ecManager sends the monitoring requests to the affected ecAgents.

The operation of step 610 will now be further explained. The specified analysis is based on the eContract, especially the description of business transactions and the financial impact of their service levels. For example, a business transaction might be "Browser catalogue request issued by measurement probe 13" and the business financials might be "Charge the service provider $1.00 for every probe 13 transaction that exceeds 2 seconds" (e.g., a non-compliance penalty imposed on the service provider as a consequence of not providing service at the guaranteed levels). From this, the monitoring analyzer 240 knows that response times must be collected from probe 13.

FIG. 7 illustrates a sample of the information content in an eContract. This is structured as three tables: transaction definitions 700, financial metrics 710, and financial reporting and optimization 720. Transactions are defined in terms of: an identifier 732; a type 734 (which specifies the software needed to execute the transaction); a location 736 where the transaction is directed (e.g., a universal resource locator or URL); and parameters 738 of the transaction.

Financial metrics are specified by: a unit 740 for which financial metrics are calculated (e.g., a transaction, a month); a reference 742 associated with this unit (e.g., which transaction); an IT metric 744 (e.g., response time), an IT value 746 or constraint (e.g., <2 seconds); an IT source 748 associated with the transaction metrics (e.g., response times from probe 13 are less than 2 seconds); a financial metric 750 (e.g., a cost incurred or a revenue received); and an amount 752 of the financial metric.

Financial reporting and optimization are structured similarly and so are in the same table. The information here may comprise: a type 754 (either report or optimization); a time interval 756 for which data is collected; how the data is aggregated 758 (e.g., average, sum); and a financial metric 760 (e.g., revenue, profit) used. The latter refers to the FIValue field 752 in the financial metrics table, or simple financial metrics that can be derived from these (e.g., profit=revenue−cost).

The sample eContract in FIG. 7 is used to illustrate the operation of the invention. In contract-based monitoring, as described in FIG. 6, it is shown how the eContract is analyzed in step 610. The financial reporting and optimization section 720 of the eContract is read, from which it is determined what financial metrics should be collected over what intervals (e.g., revenue and profit). From these, raw financial metrics are determined, such as cost and revenue. Then, the financial metrics section 710 of the eContract is examined to determine how to obtain these metrics. In FIG. 7, one metric depends on Tx ID 1 and the other is accrued on a monthly basis. For the former, the transaction definitions section 700 of the eContract is consulted to determine the IT data and the mechanism for measuring the transaction.

Similarly, it is shown how reporting is done in terms of eContracts. First, the financial reporting and optimization section 720 of the eContract is consulted. All entries of type "Report" are examined to determine the required raw financial metrics and the IT transactions required (in the same manner as for monitoring). Then, as data is collected, financial metrics are computed, and the appropriate reports are generated.

Action taking, as described in FIG. 5, is done in a similar manner. The only difference is that instead of reporting the results, transactions are identified whose IT performance must be improved (e.g., increase throughputs, decrease response times) in order to optimize financial metrics. Actions are initiated to improve the IT performance of transactions.

Figure 8:
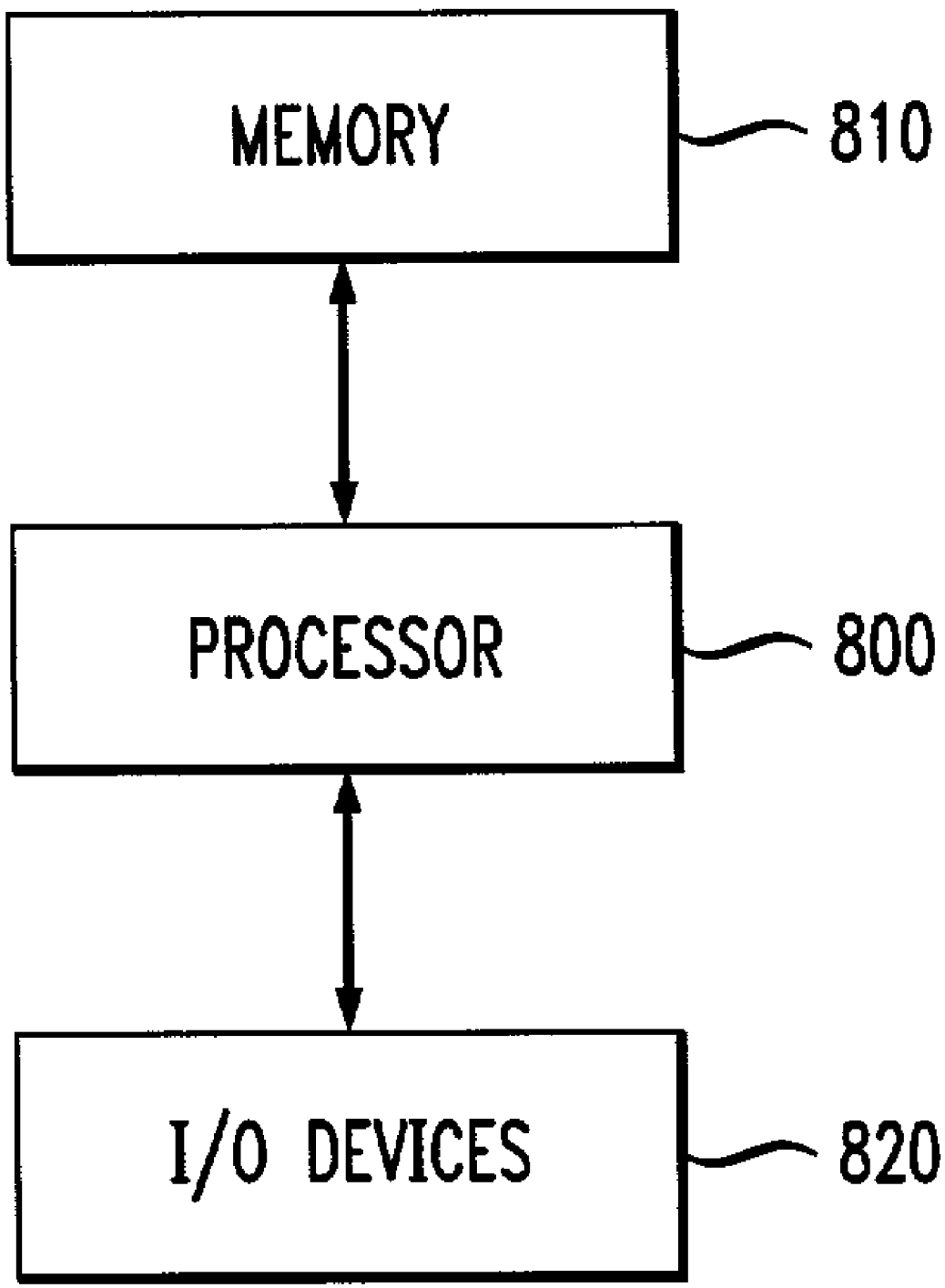
FIG. 8 is a block diagram illustrating a generalized hardware architecture of a computer system suitable for implementing an automated service level management system according to the present invention.

Referring now to FIG. 8, a block diagram is shown illustrating a generalized hardware architecture of a computer system suitable for implementing one or more of the functional components/modules of an automated service level management system of the invention, as depicted in the figures and explained in detail herein, e.g., ecManager, ecAuthoring system, ecAgents, eContract repository, measurement repository, and their respective constituent components. It is to be appreciated that the automated system may be implemented with one or more of the computer systems shown in FIG. 8.

As shown, the computer system may be implemented in accordance with a processor 800, a memory 810 and I/O devices 820. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be effected therein by one skilled in the art without departing from the scope of spirit of the invention.

What is claimed is:

1. Apparatus for use in managing a service level associated with resources in a distributed information technology (IT) system based on financial terms, the apparatus comprising:
at least one processor operative to: (i) construct and maintain an electronic contract that contains information pertaining to descriptions of one or more business transactions in IT terms, financial implications of one or more business transaction service levels, and reporting to be performed in one or more financial terms; (ii) measure at least one service level of at least one distributed element of the IT system in terms of one or more business metrics based on the electronic contract and based at least in part on input received from at least one agent module located in the at least one distributed element; (iii) determine at least one financial optimization based at least in part on the measured at least one service level of at least one element of the IT system and based at least in part on the electronic contract, the financial optimization being specified in the electronic contract at the time of construction such that, at the time the financial optimization is to be determined, the electronic contract is accessed to identify a particular financial metric of the financial optimization that is to be computed and to identify an operation for computing the particular financial metric, the one or more business metrics are converted to one or more financial equivalents wherein the one or more financial equivalents comprise a cost of a lost connection, a cost of down time, and a relationship between revenue and network latency; and (iv) issue at least one control command based on the at least one financial optimization, the command to be executed on the at least one distributed element by the at least one agent module located in the at least one distributed element; and
memory, operatively coupled to the at least one processor, for storing at least one of the electronic contract and results of the measurement operation.

2. The apparatus of claim 1, wherein the measuring operation comprises monitoring one or more IT parameters and evaluating results in terms of the one or more business metrics.

3. The apparatus of claim 2, wherein the evaluating operation is performed in real time or at a subsequent time.

4. The apparatus of claim 1, wherein the measuring operation comprises accumulating a historical collection of IT data and evaluating results in terms of the one or more business metrics.

5. The apparatus of claim 1, wherein the measuring operation comprises collecting measurement data from one or more sources, combining the collected measurement data, and interpreting the collected measurement data in terms of the one or more business metrics.

6. The apparatus of claim 1, wherein the measurement operation comprises monitoring hardware characteristics of the IT system.

7. The apparatus of claim 6, wherein the hardware characteristics comprise at least one of temperature and power consumption.

8. The apparatus of claim 1, wherein the measurement operation comprises monitoring software characteristics of the IT system.

9. The apparatus of claim 8, wherein the software characteristics comprise at least one of bandwidth usage, availability, response time, and latency.

10. The apparatus of claim 1, wherein the IT system comprises a collection of hardware and software intended to store or deliver data in a digital form.

11. The apparatus of claim 1, wherein the one or more business metrics comprise a measurement that directly measures the performance of a business.

12. The apparatus of claim 1, wherein the measurement comprises at least one of an operational cost, customer satisfaction, and relative industry performance.

13. The apparatus of claim 1, wherein results of the one or more business metrics are used to set IT parameters.

14. The apparatus of claim 1, wherein the one or more business metrics are reported to one or more parties.

15. The apparatus of claim 1, wherein the one or more business metrics are aggregated so as to obscure details reported to a third party.

16. The apparatus of claim 1, wherein reporting is performed in financial terms based on the electronic contract.

17. The apparatus of claim 1, wherein enactment is performed based on financial optimizations using the electronic contract.

18. The apparatus of claim 1, wherein the one or more business metrics to monitor are inferred from the electronic contract.

19. Computer-based apparatus for use in managing a service level associated with resources in a distributed information technology (IT) system based on financial terms, the apparatus comprising:
one or more processors comprising:
an electronic contract manager module, operative to construct and maintain an electronic contract that contains information pertaining to descriptions of one or more business transactions in IT terms, financial implications of one or more business transaction service levels, and reporting to be performed in one or more financial terms and to determine at least one financial optimization based at least part on the measured at least one service level of at least one element of the IT system and based at least in part on the electronic contract, the financial optimization being specified in the electronic contract at the time of construction such that, at the time the financial optimization is to be determined, the electronic contract is accessed to identify a particular financial metric of the financial optimization that is to be computed and to identify an operation for computing the particular financial metric, the one or more business metrics are converted to one or more financial equivalents wherein the one or more financial equivalents comprise a cost of a lost connection, a cost of down time, and a relationship between revenue and network latency; and one or more electronic contract agent modules, operatively coupled to the manager module and located in one or more distributed elements of the IT system being monitored, operative to measure at least one service level of at least one distributed element of the IT system in terms of one or more business metrics based on the electronic contract and to execute at least one control command based at least in part on at least on the at least one distributed element; and one or more memories, operatively coupled to the one or more processors, for storing at least one of the electronic contract and results of the measurement operation.

20. The apparatus of claim 19, further comprising an electronic contract authoring system, operatively coupled to the manager module, operative to construct one or more electronic contracts that contain information pertaining to descriptions of one or more business transactions in IT terms, financial implications of one or more business transaction service levels, and reporting to be performed in the one or more financial terms.

21. The apparatus of claim 19, wherein the manager module is further operative to: (i) identify one or more business transactions; (ii) compute one or more transaction service levels; and (iii) compute one or more business metrics based on the one or more service levels; and (iv) reporting results associated with the one or more business metrics.

22. The apparatus of claim 19, wherein the manager module is further operative to: (i) identify one or more business transactions; (ii) forecast the one or more transactions over an enactment interval; (iii) predict performance and determine optimizations based on financial criteria; and (iv) initiate actions based on the predicted performance and the determined optimizations.

23. A computer-based method for use in managing a service level associated with resources in a distributed information technology (IT) system based on financial terms, the method comprising the steps of:

automatically constructing and maintaining, via a processor of a computer, an electronic contract that contains information pertaining to descriptions of one or more business transactions in IT terms, financial implications of one or more business transaction service levels, and reporting to be performed in one or more financial terms;

automatically measuring, via the processor of the computer, the operation of at least one distributed element of the IT system in terms of one or more business metrics based on the electronic contract and based at least in part on input received from at least one agent nodule located in the at least one distributed element;

automatically determining, via the processor of the computer, at least one financial optimization based at least part on the measured one or more business metrics of the at least one distributed element of the IT system and based at least in part on the electronic contract, the financial optimization being specified in the electronic contract at the time of construction such that, at the time the financial optimization is to be determined, the electronic contract is accessed to identify a particular financial metric of the financial optimization that is to be computed and to identify an operation for computing the particular financial metric, the one or more business metrics are converted to one or more financial equivalents wherein the one or more financial equivalents comprise a cost of a lost connection, a cost of down time, and a relationship between revenue and network latency; and automatically issuing, via the processor of the computer, at least one control command based on the at least one financial optimization, the command to be executed on the at least one distributed element by the at least one agent module located in the at least one distributed element.

24. The method of claim 23, wherein the measuring step comprises monitoring one or more IT parameters and evaluating results in terms of the one or more business metrics.

25. The method of claim 23, wherein the measuring step comprises accumulating a historical collection of IT data and evaluating results in terms of the one or more business metrics.

26. The method of claim 23, wherein the measuring step comprises collecting measurement data from one or more sources, combining the collected measurement data, and interpreting the collected measurement data in terms of the one or more business metrics.

27. The method of claim 23, wherein the measurement operation comprises monitoring at least one of hardware and software characteristics of the IT system.

28. The method of claim 23, wherein the IT system comprises a collection of hardware and software intended to store or deliver data in a digital form.

29. The method of claim 23, wherein the one or more business metrics comprise a measurement that directly measures the performance of a business.

30. The method of claim 23, wherein results of the one or more business metrics are used to set IT parameters.

31. The method of claim 23, wherein the one or more business metrics are reported to one or more parties.

32. The method of claim 23, wherein the one or more business metrics are aggregated so as to obscure details reported to a third party.

33. The method of claim 23, wherein reporting is performed in financial terms based on the electronic contract.

34. The method of claim 23, wherein enactment is performed based on financial optimizations using the electronic contract.

35. The method of claim 23, wherein the one or more business metrics to monitor are inferred from the electronic contract.

36. An article of manufacture for use in managing a service level associated with resources in a distributed information technology (IT) system based on financial terms, comprising a machine readable storage medium containing one or more programs which when executed implement the steps of:

automatically constructing and maintaining an electronic contract that contains information pertaining to descriptions of one or more business transactions in IT terms, financial implications of one or more business transaction service levels, and reporting to be performed in one or more financial terms;

automatically measuring the operation of at least one distributed element of the IT system in terms of one or more business metrics based on the electronic contract and based at least in part on input received from at least one agent nodule located in the at least one distributed element;

automatically determining at least one financial optimization based at least part on the measured one or more business metrics of the at least one distributed element of the IT system and based at least in part on the electronic contract, the financial optimization being specified in the electronic contract at the time of construction such that, at the time the financial optimization is to be determined, the electronic contract is accessed to identify a particular financial metric of the financial optimization that is to be computed and to identify an operation for computing the particular financial metric, the one or more business metrics are converted to one or more financial equivalents wherein the one or more financial equivalents comprise a cost of a lost connection, a cost of down time, and a relationship between revenue and network latency; and automatically issuing at least one control command based on the at least one financial optimization, the command to be executed on the at least one distributed element by the at least one agent module located in the at least one distributed element.

\* \* \* \* \*

UNITED STATES PATENT AND TRADEMARK OFFICE
CERTIFICATE OF CORRECTION

| | | |
|---|---|---|
| PATENT NO. | : 7,610,228 B2 | Page 1 of 1 |
| APPLICATION NO. | : 09/896254 | |
| DATED | : October 27, 2009 | |
| INVENTOR(S) | : Hellerstein et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1933 days.

Signed and Sealed this

Twelfth Day of October, 2010

David J. Kappos
*Director of the United States Patent and Trademark Office*